(12) United States Patent
Andersson et al.

(10) Patent No.: US 7,382,444 B2
(45) Date of Patent: Jun. 3, 2008

(54) MULTIPLE OPTICAL CHANNELS

(75) Inventors: Leif Andersson, Solna (SE); Mikael Herzman, Sollentuna (SE); Christian Grässer, Stadtroda (DE); Rolf Richter, Jena (DE)

(73) Assignee: Trimble AB, Danderyd (SE)

( * ) Notice: Subject to any disclaimer, the term of this patent is extended or adjusted under 35 U.S.C. 154(b) by 152 days.

(21) Appl. No.: 10/518,088

(22) PCT Filed: Jun. 18, 2003

(86) PCT No.: PCT/SE03/01027

§ 371 (c)(1),
(2), (4) Date: Oct. 24, 2005

(87) PCT Pub. No.: WO04/001333

PCT Pub. Date: Dec. 31, 2003

(65) Prior Publication Data

US 2006/0114448 A1   Jun. 1, 2006

(30) Foreign Application Priority Data

Jun. 19, 2002   (SE)   .................................... 0201882

(51) Int. Cl.
*G01C 3/08*   (2006.01)
(52) U.S. Cl. ..................... 356/5.11; 356/4.01
(58) Field of Classification Search ............... 356/4.01, 356/5.01, 5.11, 28
See application file for complete search history.

(56) References Cited

U.S. PATENT DOCUMENTS

| | | | |
|---|---|---|---|
| 5,600,487 A * | 2/1997 | Kiyomoto et al. | 359/634 |
| 5,914,817 A * | 6/1999 | Browning et al. | 359/634 |
| 5,936,736 A | 8/1999 | Suzuki et al. | |
| 6,504,602 B1 * | 1/2003 | Hinderling | 356/5.1 |
| 6,586,748 B1 * | 7/2003 | Lloyd et al. | 250/455.11 |
| 2001/0045529 A1 * | 11/2001 | Iketaki et al. | 250/493.1 |

FOREIGN PATENT DOCUMENTS

| | | |
|---|---|---|
| EP | 0987517 A2 | 3/2000 |
| EP | 1054232 A2 | 11/2000 |
| EP | 1081459 A1 | 3/2001 |

OTHER PUBLICATIONS

Databas WPI; Week 200122; Derwent Publications Ltd., London GB An 1998-351266 & jp 10132561 A 19980522.

* cited by examiner

*Primary Examiner*—Thomas H. Tarcza
*Assistant Examiner*—Isam Alsomiri
(74) *Attorney, Agent, or Firm*—Harness, Dickey & Pierce, P.L.C.

(57) ABSTRACT

The invention relates to an electronic distance measuring apparatus for surveying, e.g. for measuring the distance from the apparatus to an object. The apparatus comprises: a) an objective lens (101), defining an optical axis (OA), b) at least two sources (111, 112) of structured light for transmitting beams ($\lambda_1$, $\lambda_2$) of separate wavelengths towards said object, said beams on reflection from said object received by the objective lens (101), (c) at least two receivers (141, 142) arranged outside a beam path (109) as defined by the objective lens (101), and adapted to receive said received beams ($\lambda_1$, $\lambda_2$) of structured light. Optical means comprising at least two dichroic surfaces (121a, 122a) are each arranged at a tilt angle ($\alpha_1$, $\alpha_2$) with respect to said axis (OA), said optical axis (OA) passing through said surfaces, at least one of said dichroic surfaces arranged on a plate (121, 122), said at least two dichroic surfaces (121a, 122a) adapted to reflect at least one of said received structured light beams ($\lambda_1$, $\lambda_2$), respectivly, towards said receivers (141, 142).

11 Claims, 4 Drawing Sheets

MULTIPLE OPTICAL CHANNELS

FIELD OF THE INVENTION

The present invention generally relates to an automatic survey instrument comprising a source of structured light for transmitting a beam of said light towards said object, a receiver adapted to receive said reflected structured light beam when reflected from said object, said received light being co-axial with the transmitted light, an objective lens and a reticle with optical means positioned there-between, said objective lens and said reticle defining an optical axis. The invention more specifically relates to the arrangement for redirecting the reflected light in the receiver.

BACKGROUND ART

Automatic survey instruments of the present type comprise a telescope system where received light can be divide into separate channels for range-finding, tracking and viewing or manual aiming. The transmitter beam for the rangefinder and for the tracker function are preferably coaxial to the receiver optics.

The light reflected from the target object, and received at the instrument is divided, depending upon the purpose, in light components of different wavelengths such as the light for tracking, range finding and visible light for viewing. By using the tracking light and range finding light thus divided, range finding and automatic tracking may be performed.

Such instruments, using more than one channel, according to the prior art, uses different types of prisms in the receiver with or without dichroic coatings for splitting/separating the beams into the different channels.

The word dichroic in this context refers to dichroic mirrors/prisms or coatings, which exhibit selective reflection and transmission of light as a function of wave-length regardless of its plane of vibration. A dichroic mirror thus selectively reflects light according to its wave-length and transmits light having other wavelengths. The use of prisms, i.e. cubic prisms primarily requires long building lengths, problems in providing needed filters within the prisms and inherently high costs, in that the costs for producing the prisms are high.

Belonging to the related art are e.g. EP-1 081 459 and EP-0 987 517. In these discussions of problems related to the use of prisms can be found. In EP-0 987 517 e.g. the arrangement includes several prisms in which two beams having different wavelengths are separated using two dichroic prisms. In EP-1 081 459 prisms are disclosed, but also one dichroic plate is used for separating beams with different wavelengths; however, that plate is arranged perpendicular to the optical axis of the instrument, thus reflecting the light in the coaxial direction, while allowing other wavelengths to pass through the plate.

The use of prisms, however, introduces certain problems. Drawbacks are the fact the glass extends the optical path so the building length increases, the size of the prisms become large and the prisms are heavy. The requirements on parallelity between prisms surfaces are very high and making a dichroic filter within the glass is harder than on a surface between air and glass. All this means that the prisms become large and expensive and the telescope becomes larger and heavier. More advanced prism constructions can reduce building length but the costs further increases for providing the prisms and the complicated structure resulting therefrom. Aditionally, the prisms make the apparatus larger and heavier causing other problems as increased power consumption, as when automatically tracking an object.

Examples of wavelengths used for visible light are in the range of 400 nm to 650 nm for collimating purposes. For range-finding visible light at 660 nm or IR light at 850 nm can be used and for tracking IR light at 785 nm. These wavelength ranges are generally termed channels of a particular type such as visual channel, tracking channel etc.

DISCLOSURE OF THE INVENTION

The present invention intends to overcome the above mentioned problem by a solution which is both simple and inexpensive.

This object has been achieved by a automatic survey instrument of the initially defined kind, wherein tilted dichroic plates arranged primarily on the optical axis defined by the objective lens and the reticle of the instrument, which according to this invention preferably also coincides with the visual channel, i.e. the optical path for the visible light used when viewing the target through the apparatus. Secondary mirrors may be used to fold the optical paths within the apparatus. These secondary mirrors may be of the dichroic type.

Substituting prisms for separating the different channels with plates results in simpler components, simpler coatings and generally shorter telescope length. As referred to above with the use of prisms, the channels are separated and/or reflected by passage through the prism, entering the prism from air through a first surface and exciting the prism to air. During that process the light (IR or visual) is either reflected against second prism surface and thereafter exists the prism through a third surface of the prism or it is allowed to pass through the second surface. The resulting optical path within the prism may either be depending on the type of prism material used or in this case the second prism surface may have a dichroic coating. Depending on the desirability of short telescope lengths this will increase the complexity of the prisms.

According to the invention the prisms have been replaced by tilted dichroic plates and/or mirrors; however, one prism may be used in one of the optical paths. This results in simpler components, simpler coatings, lower costs, and shorter telescope lengths, as will be shown.

By using the tilted dichroic plates it is possible to reflect the different channels in a direction where the reflected beam is non-coaxial with the main optical axis of the apparatus and thus arrange for receivers or sensors placed adjacent to a volume as defined by the aperture and the focusing lens. The plates will, however, introduce optical aberrations in the beam passing through the plate, e. g. coma and astigmatism, as the plates by necessity have to have a certain thickness in order to be stable.

These effects may be compensated for in a number of ways, which will be shown in the different embodiments below.

Making the plates slightly wedge-shaped will compensate the aberrations from the tilted plate. The wedge angle has to be chosen in relation to the tilt angle and the thickness of the plate. A person skilled in the art may, using an optical design program, optimize the wedge angle.

A second method is to add a third plane-parallel compensating plate tilted around an axis perpendicular to the tilt axes of the first plates.

Tilting two plane parallel plates around axes that are perpendicular to each other is a third manner in which to reduce the aberrations introduced by the tilt.

BRIEF DESCRIPTION OF THE DRAWINGS

FIG. 1b shows a detail of FIG. 1a

In the drawings like details are shown using corresponding reference numbers.

DETAILED DESCRIPTION OF THE EXEMPLARY PREFERRED EMBODIMENTS

Figure 1A:
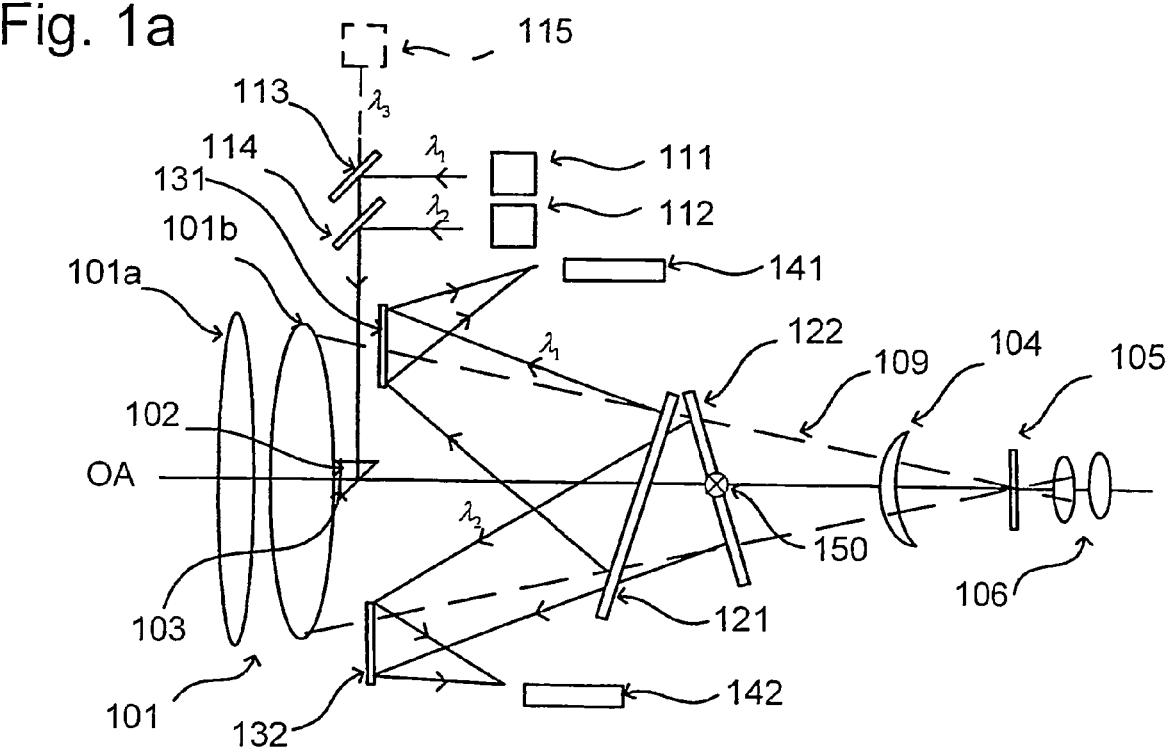
FIG. 1a shows schematically a side view of a first embodiment according to the invention.

In FIG. 1 is shown a first preferred embodiment of an apparatus according to the invention in which an objective lens, 101a and 101b, defines an optical axis OA. On this axis is seen a focusing lens 104 and a reticle 105. The focusing lens 104 is movable as is known to the man skilled in the art for focusing of the incoming light on the reticle. The image may be viewed through an eyepiece 106. Adjacent to the objective and preferably attached to the inside of the lens 101b, a prism 102 with a reflective surface 103 is arranged on the optical axis OA. The surface 103 of the prism 102 may have a dichroic coating 103. The purpose of this prism is to reflect the beams $\lambda_1$ and $\lambda_2$ of structured light from two transmitters 111 and 112 in the form of sources of structured light, such as a laser or a Light Emitting Diode (LED), forming a transmitted light path through the prism 102, where the light is reflected out through the objective lens 101 towards a target. The prism shown is in the form of a 45°-90°-45° prism used as a "right-angle prism", i.e. the prism will turn the beam through a 90°-bend. This requires that the beams $\lambda_1$ and $\lambda_2$ arrive at the optical axis perpendicular to said axis. This set-up simplifies the geometry. However this perpendicularity is not necessarily an essential element of the invention.

Both beams $\lambda_1$ and $\lambda_2$ exit the objective lens 101 coaxially as shown in the figure. In order to accomplish this, the transmitters have been arranged such that the beams $\lambda_1$ and $\lambda_2$ each are reflected in a respective dichroic mirror 113 and 114, directly or via a light guide, such that the thus reflected beam incident on the mirrors 113 and 114 form a coaxial beam hitting the prism 102, i. e. the beam $\lambda_1$ transmitted from the transmitter 111 is reflected in the mirror 113 and is transmitted through the mirror 114, while the beam $\lambda_2$ transmitted from the transmitter 112 is reflected in the mirror 114 thus forming a common optical path.

The light reflected from the target reaches the objective lens in the form of a beam composed of the transmitted wavelengths and normally broadened as to cover the total area of the objective lens. It will be understood that the prism 102 is small in relation to the area of the objective lens and thus will obstruct a relatively small part of the composed beam $\lambda_1$, $\lambda_2$ reflected by the target.

Two dichroic plates 121, 122 are arranged in a tilted manner in the reflected beam on the optical axis OA, between the prism 102 and the reticle 105. "Tilted" in this context should be taken to mean that the plates are arranged such as to not be perpendicular to the optical axis OA. Part of the beam having the wavelength $\lambda_1$ is reflected in the first tilted plate 121 towards a mirror 131, which reflects the beam towards a detector 141. Likewise the part of the beam, having the wavelength $\lambda_2$ is allowed to pass through the first plate 121 on to tilted plate 122 where it is reflected towards a second mirror 132 which reflects the beam towards a detector 142. The plates being tilted and not perpendicular to the beam. Also it is not required that the mirrors be perpendicular to the beam as is shown in the figure. The mirrors must of course be placed such as to deflect the beam in the direction of the receiver.

The two receivers (141,142) are arranged outside a beam path (109) as defined by the objective lens (101).

In this embodiment a further emitter 115 is indicated arranged perpendicular to the optical axis, which may emit light of a wavelength $\lambda_3$. This may be used for some third reason e.g. as a visible beam to aid pointing to a target.

Figure 1B:
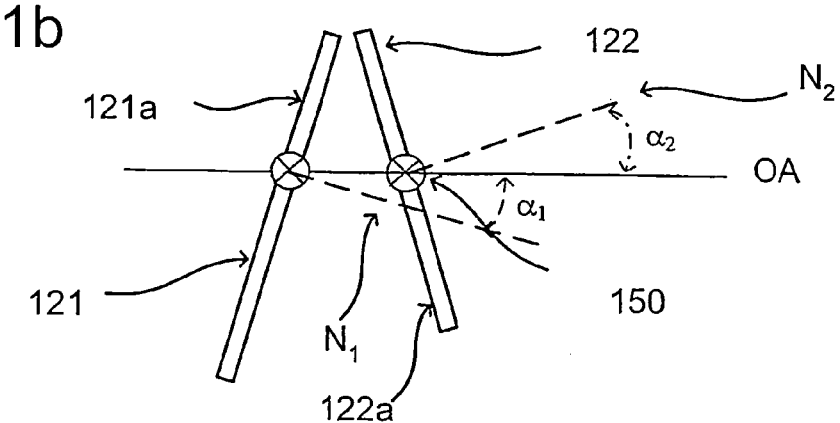

The tilt angle α is shown in FIG. 1b, which shows a detail of FIG. 1a. The tilt angle is defined as the angle between the normal $N_1$, $N_2$ to the plate and the optical axis OA.

The axis around which the plate is tilted e.g. the axis indicated as 150, defines a tilt direction will be shown below to be of interest.

Figure 2A:
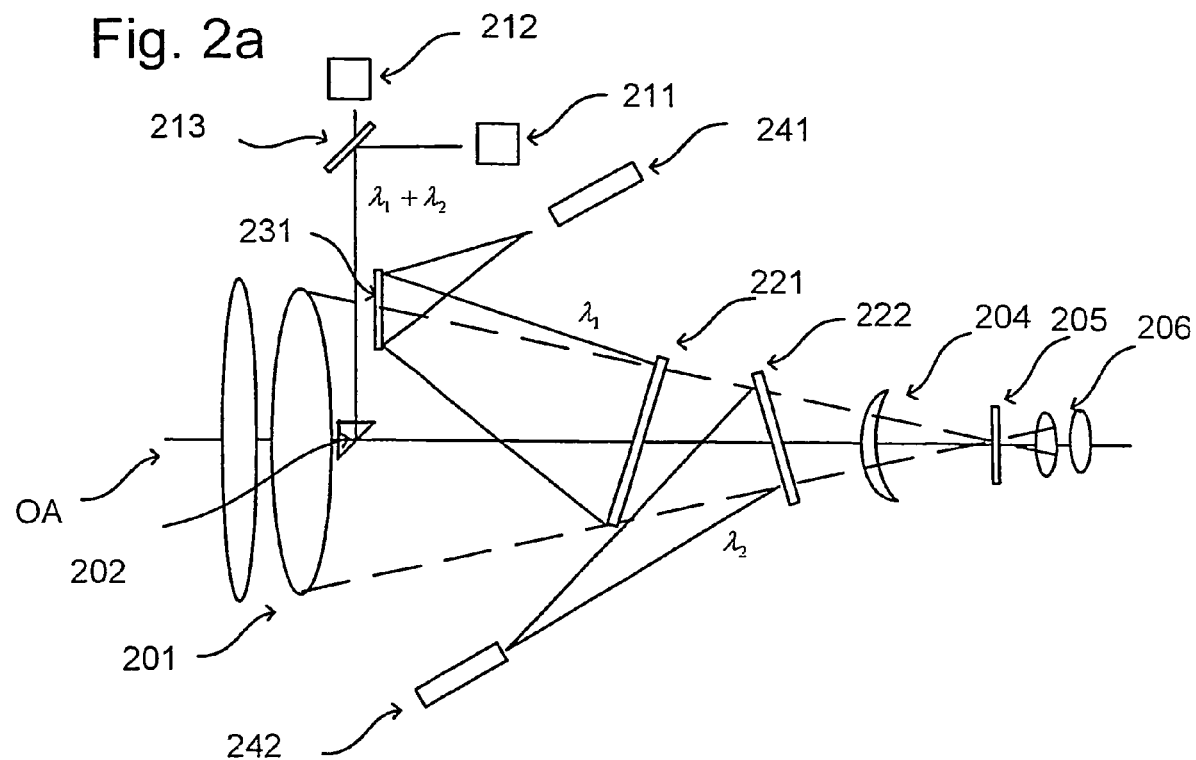
FIG. 2a shows schematically a side view of a second embodiment according to the invention.

In FIG. 2a a second embodiment according to the invention is shown in which like numbers are used to indicate corresponding details. The lens system 201, the prism 202, the focusing lens 204, the reticle 205, the eyepiece 206 and the optical axis AO are similar to each other and serve essentially the same purposes.

In this second embodiment transmitter 211, transmitting light of the wavelength $\lambda_1$, is arranged as in the first embodiment. The second transmitter 212 transmitting light of the wavelength $\lambda_2$, is arranged in the same manner as transmitter 115 in the first embodiment, making one dichroic mirror superfluous.

The optical path for $\lambda_1$ for the light reflected from the target will essentially be the same as in the first embodiment via the dichroic mirror 221 and mirror 231 towards the receiver 241. Further the tilt angle of the dichroic plates 221 and 222 have been changed such that the once reflected light of the wavelength $\lambda_2$ is directed towards the receiver 242. This has been accomplished by resizing the distance between the plate 221 and/or by changing the tilt angles of the plates to allow the beam $\lambda_2$ reflected in plate 222 to reach the receiver passing essentially adjacent to plate 221, i.e. plate 221 will not reach in to the reflected beam from plate 222. This figure also illustrates the capability to direct the beam to the detector without a second reflecting mirror.

Figure 2B:
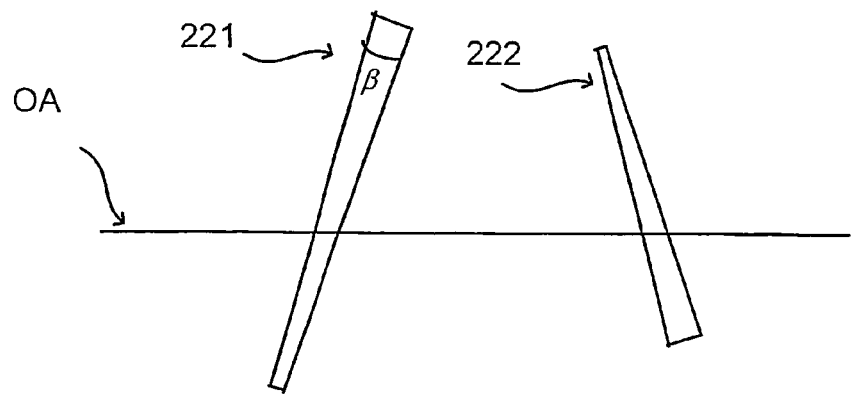
FIG. 2b shows schematically a detail of FIG. 2a of the definition of the wedge angle.

The dichroic plates may exhibit a wedge form in order to compensate for optical aberrations in the visual channel. This is illustrated in FIG. 2b in which the two plates 221 and 222 are shown, and the optical axis OA is indicated. The wedge form of the plates defines an angle of 0–30 arc seconds and will compensate for optical aberrations. It should be understood that this type of compensation may be used in the embodiment described in FIG. 1 also. The wedge form could further be used in other embodiments alone or in combination with some other compensation for the optical aberrations caused by the plates.

Figure 3:
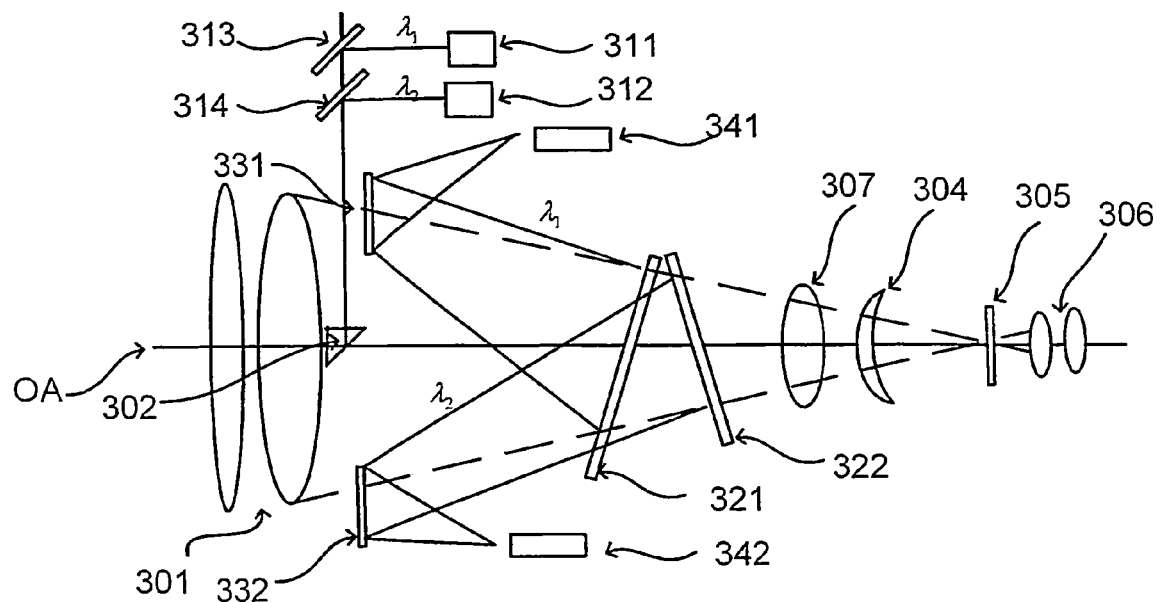
FIG. 3 shows schematically a side view of a third embodiment according to the invention.

In FIG. 3 a third embodiment according to the invention is shown in which like numbers are used to indicate corresponding details. In this embodiment the aberration compensation is accomplished by the compensating plate 307. The lens system 301, the prism 302, the focusing lens 304, the reticle 305, the eyepiece 306 and the optical axis AO are similar to each other and serve the same purposes.

In this third embodiment transmitter 311, transmitting light of the wavelength $\lambda_1$ and the second transmitter 312 transmitting light of the wavelength $\lambda_2$, are arranged in the same manner as in embodiment 1 using dichroic mirrors 313, 314 to bend the light towards the prism 302.

The optical path for $\lambda_1$ for the light reflected from the target will essentially be the same as in the first embodiment via the dichroic mirror 321 and 331 towards the receiver 341. The beam $\lambda_2$ has a beam path essentially as in FIG. 1 reflected in mirrors 322 and 332 to the receiver 342.

In this embodiment a compensating plate 307 with a tilt axis oriented 90° with respect to the tilt axis of the other plates is inserted to compensate for optical aberrations caused in the visible channel by the visible light having to transverse the plates 321 and 322.

Figure 4A:
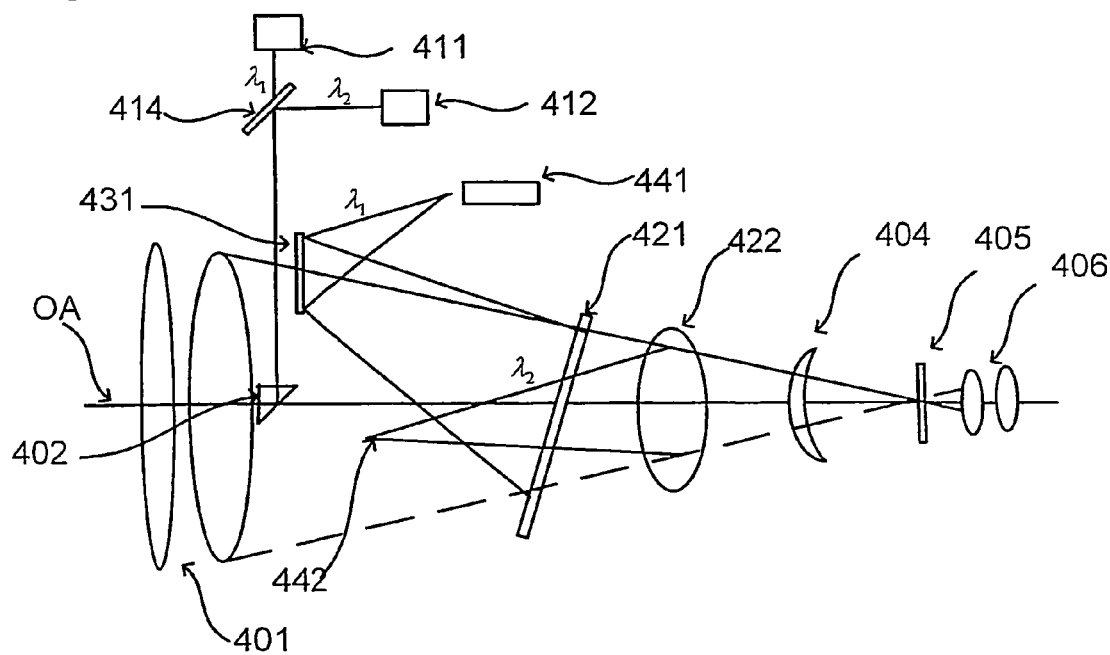
FIG. 4a shows schematically a side view of a fourth embodiment according to the invention.

In FIG. 4a a fourth embodiment according to the invention is shown in which like numbers are used to indicate corresponding details. The lens system 401, the prism 402, the focusing lens 404, the reticle 405, the eyepiece 406 and the optical axis AO are similar to each other and serve the same purposes.

In this forth embodiment a first transmitter 411, transmitting light of the wavelength $\lambda_1$ arranged perpendicular to the optical axis OA and the second transmitter 412 transmitting light of the wavelength $\lambda_2$ arranged coaxial to the optical axis OA, using dichroic mirror 414 to bend the light towards the prism 402.

The optical path for beam $\lambda_2$ is reflected by the dichroic mirror 422 in the direction of a detector 442, the tilt axis of plate 422 in this case being oriented perpendicular to the tilt axis of plate 421. This represents the third method of compensating for optical aberrations.

Figure 4B:
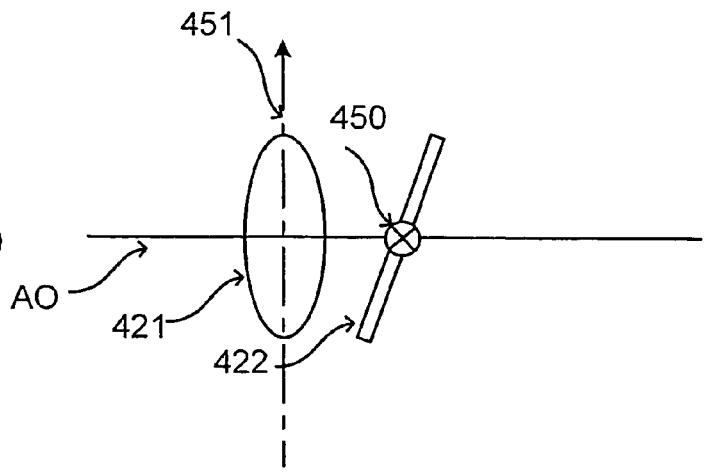
FIG. 4b shows schematically a detail of FIG. 4a in a top view.

The optical path for $\lambda_1$ for the light reflected from the target will essentially be the same as in the first embodiment via the dichroic mirror 421 and 431 towards the receiver 441. Part of the beam, light having the wavelength $\lambda_1$ is reflected in the first tilted plate 421 towards a further dichroic plate 431 which reflects the beam towards a detector 441. In this embodiment the tilt axis of the second plate 422 is essentially arranged perpendicular to the tilt axis of the first plate 421, thus serving to compensate for optical aberrations in the visible channel from the first plate A top view (detail of FIG. 4a) is shown in FIG. 4b. The axis 451 and 450 around which the plates are tilted are shown.

Figure 5:
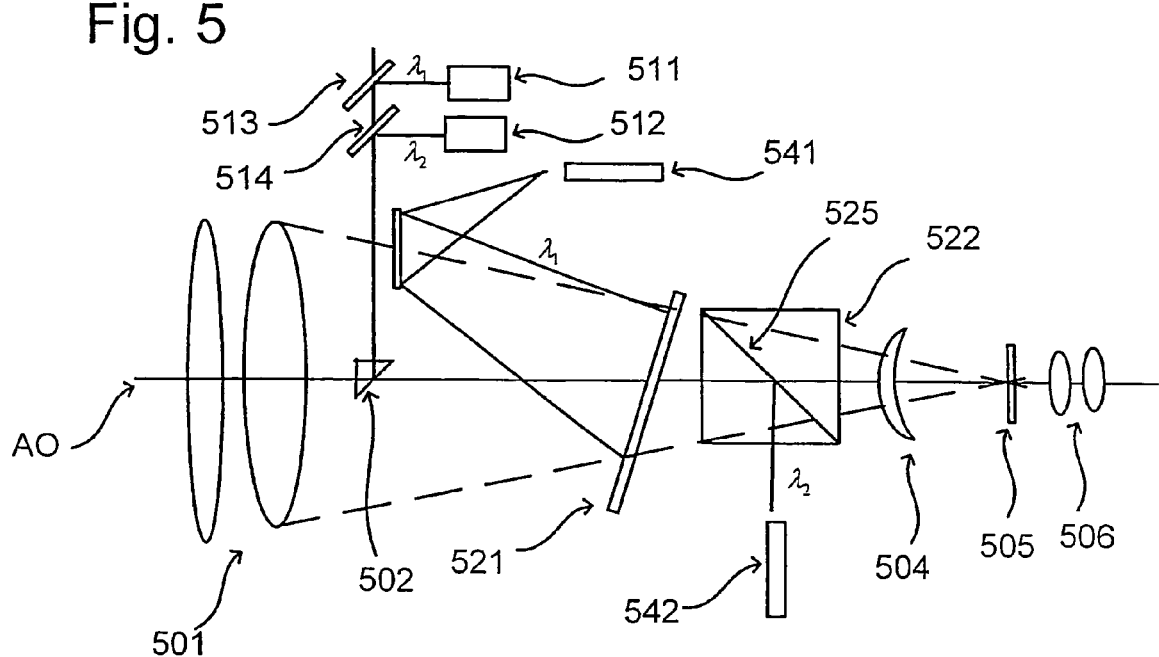
FIG. 5 shows schematically a side view of a fifth embodiment according to the invention.

In FIG. 5 is shown a fifth embodiment according to the invention. in which like numbers are used to indicate corresponding details. The lens system 501, the prism 502, the focusing lens 504, the reticle 505, the eyepiece 506 and the optical axis AO are similar to each other and serve the same purposes.

Further in FIG. 5 is shown a combination of a dichroic plate 521 and a dichroic prism 522. Beams having wavelengths $\lambda_1$ and $\lambda_2$, respectively, are transmitted from senders 511 and 512. The optical path for $\lambda_1$ for the light reflected from the target will be the same as in the first embodiment via the dichroic mirror 521 and 531 towards the receiver 541. In this case the optical aberrations can be compensated by making the plate slightly wedge-shaped, if necessary.

The embodiments described are to be understood as mere examples of embodiments according to the invention. Because the dichroic plates are relatively inexpensive as compared with complicated prism systems and also because the relative compactness that can be accomplished according to the invention this contributes to an overall compact and lightweight design of apparatuses for tracking and range-finding apparatuses.

The invention claimed is:

1. Electronic distance measuring apparatus for surveying, e.g. for measuring the distance from the apparatus to an object comprising:
    a) an objective lens defining an optical axis (OA),
    b) at least two sources of structured light for transmitting beams ($\lambda_1,\lambda_2$) of separate wavelengths towards said object, said beams on reflection from said object received by the objective lens,
    (c) at least two receivers arranged outside a beam path as defined by the objective lens, and adapted to receive said received beams ($\lambda_1,\lambda_2$) of structured light, whereat optical means comprising at least two dichroic surfaces are each arranged at a tilt angle ($\alpha_1, \alpha_2$) with respect to said axis (OA), said optical axis (OA) passing through said surfaces, at least one of said dichroic surfaces arranged on a plate, said at least two dichroic surfaces adapted to reflect at least one of said received structured light beams ($\lambda_1,\lambda_2$), respectively, towards said receivers.

2. Electronic distance measuring apparatus according to claim 1 such that said dichroic surfaces, each are arranged on separate plates.

3. Electronic distance measuring apparatus according to claim 2 wherein at least one mirror is arranged adjacent to said optical axis (AO) for redirecting at least one of the received structured light beams ($\lambda_1,\lambda_2$) reflected in said dichroic surfaces towards said receivers.

4. Electronic distance measuring apparatus according to claim 2 wherein said dichroic plates are wedge-formed, to provide correction for aberration errors.

5. Electronic distance measuring apparatus according to claim 2 wherein a compensating plate is inserted between the focussing lens and adjacent dichroic plate, whereat the tilt direction of said compensating plate and said dichroic plate, said tilt direction defined by an axis in the plane of the plate around which the plate is rotated with respect to said optical axis, are chosen such that the tilt directions of the two plates are arranged such as to be at an angle of approximately 90° with respect to each other.

6. Electronic distance measuring apparatus according to claim 2 wherein two dichroic plates are arranged such that the tilt direction of said dichroic plates, said tilt direction defined by an axis in the plane of the plate around which the respective plate is rotated with respect to said optical axis, are chosen such that the tilt directions of the two plates are arranged to be at an angle of approximately 90° with respect to each other.

7. Electronic distance measuring apparatus according to claim 1 wherein one of said dichroic surfaces is arranged on a plate and the other of said dichroic surface is arranged in a prism.

8. An electronic distance measuring apparatus according to claim 7 wherein at least one mirror is arranged adjacent to said optical axis (AO) for redirecting at least one of the received structured light beams ($\lambda_1,\lambda_2$) reflected in said dichroic surfaces towards said receivers.

9. Electronic distance measuring apparatus according to claim 1 wherein said at least two sources of structured light for transmitting said beams ($\lambda_1, \lambda_2$) are adapted to transmit said light towards a light redirect member arranged adjacent to the objective lens.

10. Electronic distance measuring apparatus according to claim 9 wherein said light redirect member is a redirecting prism.

11. Electronic distance measuring apparatus according to claim 10 wherein said redirecting prism is attached to the objective lens.

* * * * *